United States Patent
Yoon et al.

(10) Patent No.: US 10,053,631 B2
(45) Date of Patent: Aug. 21, 2018

(54) METHOD OF PREPARING HIGH SOFTENING POINT PITCH AND HIGH SOFTENING POINT PITCH PREPARED THEREBY

(71) Applicant: YUSUNG TELECOM CO., LTD., Yongin-si, Gyeonggi-do (KR)

(72) Inventors: Sung Ho Yoon, Busan (KR); Seong Hwa Hong, Daegu (KR); Suk Jun Yu, Yongin-si (KR)

(73) Assignee: YUSUNG TELECOM CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/300,703

(22) PCT Filed: Apr. 22, 2016

(86) PCT No.: PCT/KR2016/004242
§ 371 (c)(1),
(2) Date: Sep. 29, 2016

(87) PCT Pub. No.: WO2016/186329
PCT Pub. Date: Nov. 24, 2016

(65) Prior Publication Data
US 2017/0175001 A1  Jun. 22, 2017

(30) Foreign Application Priority Data
May 19, 2015  (KR) .................. 10-2015-0069372

(51) Int. Cl.
*C10C 3/02* (2006.01)
*C01B 31/04* (2006.01)
(Continued)

(52) U.S. Cl.
CPC .............. *C10C 3/026* (2013.01); *C01B 31/04* (2013.01); *C01B 31/082* (2013.01); *C08G 61/10* (2013.01);
(Continued)

(58) Field of Classification Search
CPC ...................................................... C10C 3/026
(Continued)

(56) References Cited

U.S. PATENT DOCUMENTS 3,852,428 A  12/1974  Powell et al.
4,243,512 A  1/1981  Seo

FOREIGN PATENT DOCUMENTS

JP  1998-83814 A  3/1998
JP  2012-246364 A  12/2012
(Continued)

OTHER PUBLICATIONS

E.I. Andeikov et al. "Modification of Coal Tar Pitch by High-Temperature Treatment with Polyvinyl Chloride," Russian Journal of Applied Chemistry (Zhurnal Prikladnoi Khmii), 2009, vol. 82, No. 9, pp. 1624-1629 (2009).
(Continued)

*Primary Examiner* — Duc Truong
(74) *Attorney, Agent, or Firm* — Novick, Kim & Lee, PLLC; Jae Youn Kim

(57) ABSTRACT

Provided are a method of preparing a high softening point pitch and the high softening point pitch prepared thereby, in which a polyene radical intermediate is formed, and an alkylaromatic radial material is linearly linked to the polyene radical intermediate in a benzyl or methylene form to be polymerized. The method includes performing heat treatment by adding a compound, which is able to a polyene (Continued)

radical intermediate, to 1- to 4-ring alkylaromatic condensates to produce a basic pitch, and performing vacuum heat treatment for the basic pitch.

12 Claims, 6 Drawing Sheets

(51) Int. Cl.
  *C01B 31/08*  (2006.01)
  *D01F 9/15*  (2006.01)
  *D01F 9/155*  (2006.01)
  *C08G 61/10*  (2006.01)
  *C10C 3/00*  (2006.01)
  *D01F 6/76*  (2006.01)
  *C01B 31/00*  (2006.01)

(52) U.S. Cl.
  CPC ............... *C10C 3/00* (2013.01); *D01F 6/76* (2013.01); *D01F 9/15* (2013.01); *D01F 9/155* (2013.01); *C08G 2261/314* (2013.01)

(58) Field of Classification Search
  USPC ........................................................ 528/396
  See application file for complete search history.

(56) References Cited

FOREIGN PATENT DOCUMENTS

| KR | 10-1993-0005526 B1 | 6/1993 |
|----|--------------------|--------|
| KR | 10-1999-0012606 A  | 2/1999 |
| KR | 10-0244912 B1      | 2/2000 |
| KR | 10-0305372 B1      | 7/2001 |
| KR | 10-2015-0005382 A  | 1/2015 |

OTHER PUBLICATIONS

Hyo Joon Ko et al. "Changes of Microstructure and Properties of Manufactures Modified Pitches via Pressure Changes during Heat Treatments in Coal Tar Pitch," Kor. K. Mater. Res., vol. 24, No. 6, pp. 293-300 (2014).

E. I. Andreikov, Modification of Coal Tar Pitch by High-Temperature Treatment with Polyvinyl Chloride, Macromolecular Chemistry and Polymeric Materials, Feb. 15, 2009, pp. 1523-1528, vol. 82, No. 9, Russian Journal of Applied Chemistry.

Hyo Joon Ko, Changes of Microstructure and Properties of Manufactured Modified Pitches via Pressure Changes during Heat Treatments in Coal Tar Pitch, May 15, 2014, pp. 293-2999, vol. 24, No. 6, Kor. J. Mater. Res.

METHOD OF PREPARING HIGH SOFTENING POINT PITCH AND HIGH SOFTENING POINT PITCH PREPARED THEREBY

BACKGROUND OF THE INVENTION

1. Field of the Invention

The present invention relates to a method of preparing a high softening point pitch which can be used as a precursor when coating graphite for a negative electrode of a lithium ion battery and preparing a functional carbon material, such as spherical active carbon and isotropic pitch based carbon fiber, and the high softening point pitch prepared by the method.

More particularly, the present invention relates to a method of preparing a high softening point pitch having a high softening point as a polyene radical intermediate is formed and an alkylaromatic radical material is linearly linked to the polyene radical intermediate in a benzyl or methylene form using the polyene radical intermediate and polymerized, and the high softening point pitch prepared by the method.

2. Description of the Related Art

Carbon fibers used as fillers for polymer compositions (carbon fiber reinforced plastics; CFRP) are mainly classified into polyacrylonitrile (PAN) based carbon fibers and pitch based carbon fibers according to source materials. Among them, the pitch based carbon fibers are classified into mesophase pitch based carbon fibers and isotropic pitch based carbon fibers according to the types of pitches serving as precursors. The mesophase pitch based carbon fiber is prepared using a mesophase pitch having an optical property of anisotropy as the precursor, and the isotropic pitch based carbon fiber is prepared using an isotropic pitch having an optical property of isotropy as the precursor.

Regarding the physical property of the pitch based carbon fiber, the mesophase pitch based carbon fiber generally represents high strength, high elasticity, and low elongation, while the isotropic pitch based carbon fiber represents low strength, low elasticity, and high elongation.

Meanwhile, although the mesophase pitch based carbon fiber represents high strength and high elasticity, the mesophase pitch based carbon fiber has the elongation of less than 0.7% to represent compressive strength lower than that of the PAN based carbon fiber. Accordingly, the mesophase pitch based carbon fiber has a limitation in the application to high elasticity and high thermal conductivity materials.

In contrast, although the isotropic pitch based carbon fiber represents high elongation and low price, the isotropic pitch based carbon fiber does not represent high strength of 1 GPa or more. In order to use the carbon fiber for the CFRP having both of high strength and high elongation by improving low tensile strength of the isotropic pitch based carbon fiber, there have strongly been required a new design of a molecular structure of an isotropic pitch used as a precursor of the carbon fiber, a physical design of a pitch having a high molecular weight and an effective melting characteristic, and the studies on preparation processes.

The low tensile strength of the isotropic pitch based carbon fiber may result from low molecular orientation. Since a PAN precursor, which is the same optical isotropic material, is subject to an additional melt-stretching process after a wet spinning process to be stretched to 10 times or more to form the molecular orientation, a stretching-stabilizing process is required to perform carbon-fiberization while maintaining the molecular orientation of the stretched PAN fiber.

Since a mesophase pitch precursor obtains high molecular orientation by shear stress in spinning due to a high molecular stacking property, the mesophase pitch precursor may obtain the high molecular orientation without the stretching-stabilization process. However, the mesophase pitch precursor has low elongation because of forming a carbon fiber structure in which larger domains of the mesophase pitch are linearly linked to each other.

The isotropic pitch, which serves as a precursor of the isotropic pitch based carbon fiber, may not smoothly obtain molecular orientation in spinning due to isotropic molecular orientation, a low stacking property or a non-stacking property, and a small domain structure. In particular, since pitch fiber obtained by fiberizing the pitch has a significantly brittle characteristic due to a lower molecular weight of the pitch, the pitch fiber may not obtain the same molecular weight as that of the PAN precursor through a post-stretching process. Accordingly, the pitch fiber must be stretched to a target fiber (generally, less than 2 cm) in the melting state that short die swell is maintained in a melt-spinning process, in order to obtain the molecular weight. When the design, the preparation, and the preparation process of the precursor pitch allowing molecular orientation are developed through an innovative molecular structure design, the isotropic pitch based carbon fiber having higher molecular orientation may be prepared.

In addition, the pitch based carbon fiber is prepared in the following manner. A pitch serving as a precursor is melt-spun using melt-spinning machine in the temperature range of at least 50° C. higher than a softening point and fiberized. Thereafter, the fiberized pitch is oxidized in the temperature range of a glass transition temperature of the pitch to 320° C. at an oxidation atmosphere for a predetermined time to be subject to a curing process. Then, the result is processed in the temperature range of 800° C. to 3000° C. at an inert atmosphere or a vacuum atmosphere according to uses and preparation prices. Particularly, in the carbon fiber, since the prices of the PAN and the pitch serving as the precursors occupy 40% of the whole preparation costs, when a precursor having a high carbonization yield is prepared at a low price, the price of the carbon fiber may be effectively cut down as generally known in the art.

To prepare a high softening point isotropic pitch having a softening point of at least 200° C. as a source material of the isotropic pitch based carbon fiber, an alkylaromatic condensate, a condensed aromatic compound, which is a residue of a coal and petroleum based byproduct, serving as the mixture thereof, or a material formed by distilling the alkylaromatic condensate may be subject to heat treatment and distilled at an atmospheric condition, a pressurized condition, and a vacuum condition to condensation-polymerize low molecular weight components, and to remove volatile components (Korean Patent Publication No. 1993-0005526). In addition, a source material component may be condensation-polymerized using a catalyst, such as $AlCl_3$ or $HF/BF_3$, and changed to a polymer component (Japanese Patent Publication No. 1998-83814). In addition, source molecules may be linked to each other by halogenation dehydrohalogenation by adding a halogen group ($Cl_2$ or $Br_2$) for polymerization (Korean Patent Registration No. 10-0244912 and Korean Patent Registration No. 10-0305372).

However, it is difficult to prepare high softening point isotropic pitches in similar molecular structure having relatively similar physical properties and having a narrow molecular weight distribution from various source materials which are various molecular mixtures having various kinds of reactivity through the simple heat treatment among the above methods.

The pitch prepared using $AlCl_3$ and $HF/BF_3$ through cationic polymerization to make a relatively easily controllable reaction may have a higher softening point, a higher yield rate, and narrower molecular weight distribution when comparing a pitch prepared through simple heat treatment. However, according to the preparation method using $AlCl_3$ as a catalyst, the removal of $AlCl_3$, which is a solid component, may be difficult and require great costs. In addition, according to the preparation method using $HF/BF_3$ as a catalyst, the catalyst need not be removed. However, since the catalyst has a significantly high corrosion property, great costs may be required for the process and the management of preparation facilities.

According to the method of linking source molecules to each other by halogenation dehydrohalogenation by adding the halogen group ($Cl_2$ or $Br_2$) for the polymerization, a high softening point pitch may be prepared at a higher yield rate under a lower temperature. However, when $Cl_2$ is used, there are the high corrosiveness of $Cl_2$ and the difficulty in handling of $Cl_2$, a reaction tube may be blocked due to the production of solid organic chlorate resulting from the excessive chlorine reaction, and great process costs may be required to remove an HCl component which is generated in excessively large amount. When $Br_2$ is used, problems may occur similarly to those of $Cl_2$, and the price of $Cl_2$ may increase the preparation cost of the high softening point pitch.

Recently, as researches and studies have been actively performed to use petroleum refining residues, which have an economical price, an excellent elastic modulus, and excellent thermal and electrical conductivity, as source materials of the isotropic pitch based carbon fiber, fluidized catalytic cracker (FCC), decant oil (DO), fluidized catalytic cracking decant oil (FCC-DO), and pyrolysis fuel oil (PFO) are used as the source materials, and dicumylperoxide (DCP), benzoyl peroxide, cumene hydroperoxide, t-butyl hydroperoxide, and methyl ethyl ketone peroxide, which are organic polymer radical initiators, may be used as polymerization initiators to prepare pitch for carbon fiber using pyrolysis fuel oil (PFO) (as disclosed in Korean Unexamined Patent Publication No. 10-2015-0005382). However, radicals may be non-radicals or volatilized to be removed at the temperature of at least 250° C. that condensation polymerization is mainly made. Accordingly, even if a large number of initiators are used, the high degree of condensation may not be obtained.

SUMMARY OF THE INVENTION

Accordingly, the present invention is made in order to solve the problems, occurring in the related arts, that it is difficult to prepare a high softening point isotropic pitch having narrow molecular weight distribution through simple heat treatment, it is difficult to remove impurities and great costs are required in the method of using $AlCl_3$ and $HF/BF_3$ through cationic polymerization, and great process costs are required due to the high corrosive property of $Cl_2$, the difficulty in the handling of $Cl_2$, and the production of the solid organic chlorate resulting from the excessive chlorine reaction in the method based on halogenation dehydrohalogenation by adding the halogen group, when preparing an isotropic pitch having a high softening point.

An object of the present invention is to provide a method of preparing a high softening point pitch, capable of providing a uniform and flexible spinning property, high oxidation stability after spinning, a high carbonization yield in carbonization, an optically isotropic property, and a higher molecular orientation, and the high softening point pitch prepared thereby.

In order to accomplish the object, according to one aspect of the present invention, there is provided a method of preparing a high softening point pitch, the method including performing heat treatment by adding a compound, which is able to form a polyene radical intermediate, to 1- to 4-ring alkylaromatic condensates to produce a basic pitch, and performing vacuum heat treatment for the basic pitch.

According aspect of the present invention, there is provided a high softening point pitch prepared in the method of preparing the high softening point pitch. The high softening point pitch includes 30 weight % to 60 weight % of 3- and 4-ring alkylaromatic condensates, and condensed aromatic materials are linearly linked to each other in a benzyl or methylene form to be polymerized.

As described above, the present invention has following effects.

First, a polyvinyl chloride compound is decomposed into a polyene radical intermediate and a Cl radical through a primary heat treatment reaction, and 1-ring to 4-ring alkylaromatic condensate radicals, which are formed through the reaction between the polyene radical intermediate and the Cl radical at a lower temperature, coexist while reacting with the polyene radical intermediate and the Cl radical. Accordingly, the polyene radical intermediate is linearly linked to condensed aromatic materials, which are formed through a second heat treatment reaction (Back-biting reaction) and 1-ring to 4-ring alkylaromatic condensates in a benzyl or methylene form to be polymerized, thereby preparing the high softening point pitch at a high yield rate.

In particular, according to the present invention, there can be performed a high-yield rate process of using low boiling point volatile, such as petroleum based residues, including at least 40 weight % of a material having carbon number 9 or less, which is an alkylaromatic condensate volatilized and not pitched by at least 95 weight % in the heat treatment of 350° C., as a source material through simple heat treatment, while increasing the yield rate of the high softening point pitch obtained in the final stage by at least 32 weight %.

Second, there can be prepared the carbon fiber including at least 95% of a material having the molecular weight of 400-2000 amu. by linearly increasing a molecular weight through the formation and the link of an aromatic condensate by the polyene radical, having an average molecular weight of at least of 720 amu., and including 30-60 weight % of 3- and 4-ring alkylaromatic condensates to represent the rheological behavior of shear thinning according to a non-newtonian viscosity property at the temperature which is 50° C. higher than the softening point, and to represent a high yield index of 100-300 Pa. Accordingly, higher molecular orientation can be provided in spite of an optically isotropic property in a spinning process, and there can be prepared carbon fiber having the tensile strength higher than that of carbon fiber prepared using conventional isotropic pitch under the same stabilization and carbonization conditions.

Third, there can be obtained the high softening point pitch representing an excellently uniform long fiber characteristic due to spinning, and having a linear link in the in benzyl or methylene form to represent a higher oxidation curing property and a higher carbonization characteristic.

DETAILED DESCRIPTION OF THE INVENTION

Figure 1:
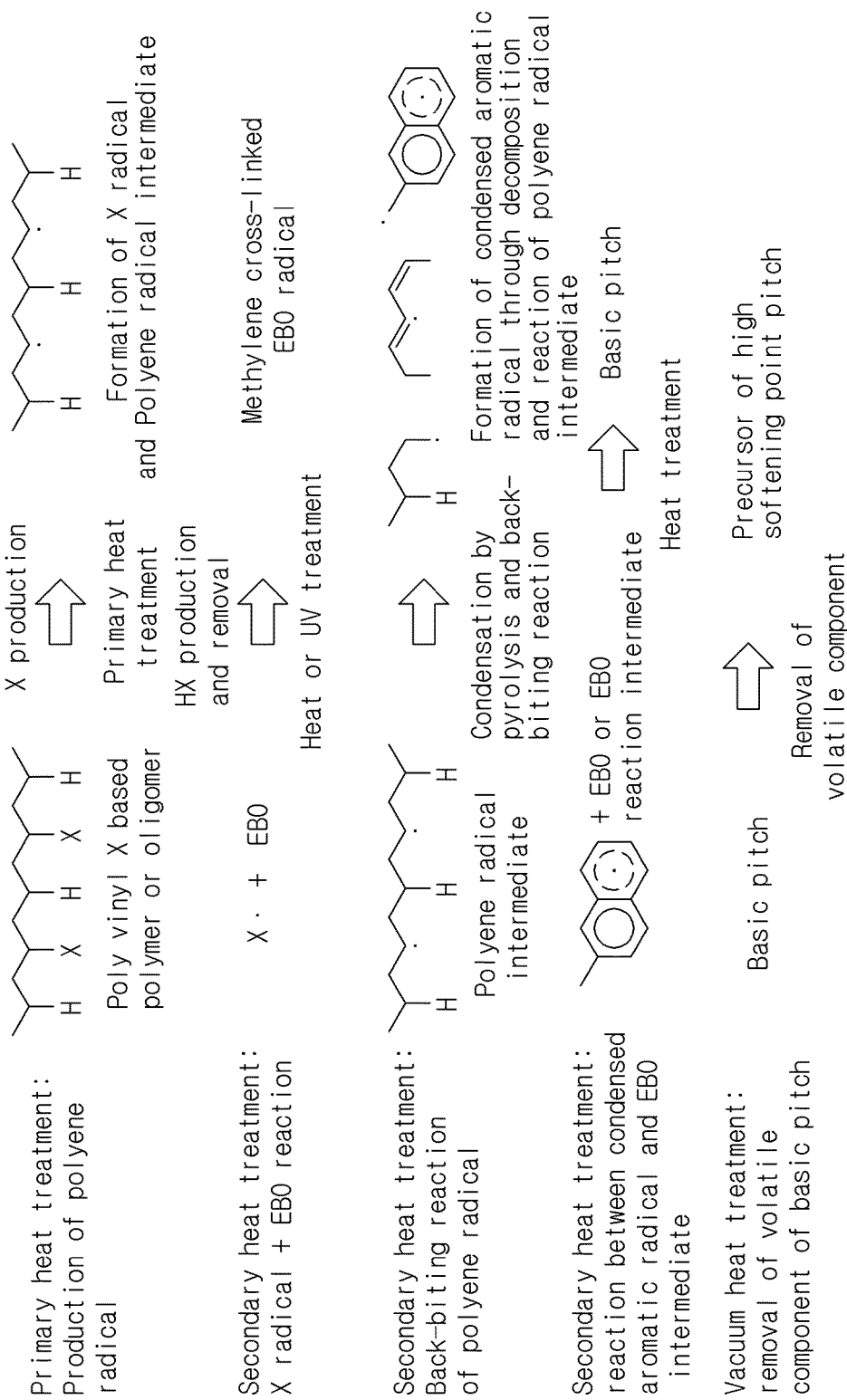
FIG. 1 is a view schematically showing reactants and reaction equipment in each process when a high softening point pitch by charging 20 weight % of vinyl chloride polymer in Embodiment 1 into decomposed petroleum based residues (ethylene bottom oil; EBO) including 1- and 2-ring alkylaromatic condensates occupying at least 85% and performing heat treatment and vacuum heat treatment.

The advantages and features of the present invention, and methods of accomplishing the preset invention will be apparently understood with reference to following description and accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims. In addition, the same reference numerals will be assigned to the same elements throughout the whole specification.

A method of preparing a high softening pitch according to the present invention has a feature of producing a basic pitch and performing vacuum heat treatment for the basic pitch by adding a compound, which is able to form a polyene radical intermediate, to 1- to 4-ring alkylaromatic condensates and performing heat treatment for the result.

In addition, the 1- to 4-ring alkylaromatic condensates, which are coal and petroleum based byproducts, may include at least one of α- or β-methylnaphthalene, or mixed methylnaphthalene thereof, naphtha cracked oil or heat treatment oil thereof, creosote oil, coal tar, and a distilled coal tar pitch.

In addition, the naphtha cracked oil preferably includes ethylene bottom oil (EBO) including 1- and 2-ring alkylaromatic condensates occupying 85% or more of the composition thereof and remaining heat treatment oil thereof. The EBO, which is produced at the bottom of a naphtha cracking center (NCC), represents the high degree of aromatization so that 1- and 2-ring alkylaromatic condensates occupy 85% or more of the composition thereof, represents 0.75 or more of aromaticity when being measured by carbon-13 nuclear magnetic resonance ($^{13}C$-NMR), and represents about 200 amu. of an average molecular weight when being measured through a TOF-Mass scheme. In addition, the EBO has an average market price of 0.3 $/Kg which is a price lower than those of coal tar and FCC-DO. Accordingly, the EBO may be appropriately used as a raw material in preparing the high softening point pitch according to the present invention.

The coal and petroleum based byproduct used in the present invention, which is a raw material including at least 40 weight % of a material having carbon number 9 or less, is an alkylaromatic condensate which is volatilized by 95 weight % or more in simple heat treatment, that is, the heat treatment of 350° C. not to be a pitch. According to the present invention, a high yield-rate process may be performed to increase the yield rate of the high softening point pitch, which is acquired in the final stage, to 32 weight % or more while the above low boiling point volatile is used as the source material.

A compound, which is able to form the polyene radical intermediate, may be a polyvinyl chloride based compound having a halogen pendant group allowing a back-biting reaction which is decomposed in a primary heat treatment reaction process at the temperature of 190° C. to 350° C. to form the polyene radical intermediate and to form an alkylaromatic condensate in a secondary heat treatment reaction process at the temperature of 350° C. to 390° C.

The vinyl chloride polymer material may include various materials which preferably include at least one of, for example, polyvinylchloride, polyvinylidene chloride, the mixture thereof, and a copolymer thereof, which serve as vinyl polymers retaining at least one chlorine for each monomer unit, and are decomposed to polyene radical intermediates regardless of molecular weights and molecular structures as 99% or more of chlorine radicals are eliminated through the heat treatment reaction at the temperature of 190° C. to 350° C. for one to ten hours, and removed in the form of hydrogen chloride after reacting with alkylaromatic condensate serving a raw material of the eliminated chlorine radicals. In the heat treatment process, the polyene radical intermediate and alkylaromatic condensate radical forming the raw material.

The vinyl chloride polymer material, which allows the supply of the polyene radical intermediate, is preferably charged at the composition ratio of 10 weight part to 100 weight part based on 100 weight part of the 1- to 4-ring alkylaromatic condensate, and more preferably charged at the composition ratio of 20 weight part to 80 weight part.

The vinyl chloride polymer material may be charged in a powder shape or a pellet shape regardless of a molecular weight as long as the vinyl chloride polymer is a material without a stabilizer and a coloring agent. The vinyl chloride polymer material has an average market price of 1.3 $/Kg. Accordingly, if 100 weight part of more of the vinyl chloride polymer material is charged, the manufacturing cost may be increased, which is undesirable.

According to the present invention, a vinyl chloride polymer compound, which is the source of the polyene radical intermediate, is charged into 1- to 4-ring alkylaromatic condensates, such as residues of a coal and petroleum process, or the mixture thereof. In this process, the basic pitch may be prepared through heat treatment under any one of atmospheric and pressurized conditions after the alkylaromatic condensates and the vinyl chloride polymer compound, which serve as source materials, are charged into a reflux stirred reactor and mixed together. The pressurized heat treatment reaction represents the final yield rate of the high softening point pitch which is about 3-6% higher than that of the atmospheric heat treatment reaction in terms of a source material. Accordingly, the pressurized heat treatment reaction is more preferable than the atmospheric heat treatment action in terms of the yield rate. However, the heat treatment process may be easily performed regardless of conditions at an inert atmosphere under the atmospheric and pressurized conditions. Although the yield rate of the final pitch is higher by 3-6% under the pressurized condition, costs of devices constituting a pressurized reactor are higher than those of an atmospheric reactor. Accordingly, any type of a process may be selected. Meanwhile, when making the reaction, it is preferred that moisture is appropriately removed in order to reduce the damage caused by corrosion.

According to the present invention, in order to obtain the high softening point pitch, which is a target material, after the vinyl chloride polymer compound, which is the source of the polyene radical intermediate, is charged into 1-ring to 4-ring alkylaromatic condensates, such as residues of the coal and petroleum process, or the mixture thereof, decomposition and reaction are induced in the heat treatment process. In this case, the heat treatment is a two-step heat treatment.

The primary heat treatment process is performed at the temperature in the range of 190 to 350° C. to decompose the vinyl chloride polymer material into the polyene radical intermediate. The chlorine radical, which is by-produced in this process, reacts with hydrogen at the location of 1-methyl group of the alkylaromatic condensate, which is a source material to induce an alkylaromatic condensate radical and to by-produce hydrogen chloride.

The primary heat treatment is preferably performed at the temperature of 200-350° C. for one to ten hours, which is sufficient to decompose 99% or more of the charged vinyl chloride polymer into the polyene radical intermediate. More preferably, the primary heat treatment is performed at the temperature ranging from 240° C., which is 50° C. higher than 190° C. that the vinyl chloride polymer is started to be decomposed, to 330° C. that the alkylaromatic condensate is rapidly decomposed and volatilized for three to six hours. If the reaction temperature is less than 190° C., the vinyl chloride polymer is hardly decomposed. If the reaction temperature is equal to or more than 350° C., the vinyl chloride polymer is rapidly decomposed and a Back-biting reaction occurs together. Accordingly, the reaction is uniformly not made, so that an applicable pitch may not be acquired.

The secondary heat treatment process includes a process of reacting the polyene radical intermediate, which is induced during heating at a temperature of 350-390° C., with the 1- to 4-ring alkylaromatic condensates such that 3- and 4-ring alkylaromatic condensates are relatively linearly linked to each other in a benzyl or methylene form to be polymerized.

In detail, the polyene radical intermediate, which is formed through the second heat treatment, makes a Back-biting reaction while reacting with a product of the Back-biting reaction and the an alkylaromatic condensate radical derived from a separate source material to be linearly linked to 3- and 4-ring alkylaromatic condensates in the benzyl or methylene form and thus to be polymerized.

In this case, if the reaction temperature is less than 350° C., long time is required for the Back-biting reaction of the polyene radical intermediate and the reaction between a material subject to the Back-biting reaction and the alkylaromatic condensate radical, which is undesirable. If the reaction temperature is equal to or more than 390° C., an insoluble fraction, such as cokes, and a mesophase pitch sphere optically having an anisotropy property are formed from the rapid reaction, so that an isotropic property may not be maintained.

In addition, the reaction time is preferably in the range of one to six hours. If the reaction time is less than one hour, polymerization is not sufficiently made, which is undesirable. If the reaction time is equal to or more than six hours, a tissue may have an anisotropic mesophase property due to an excessive reaction.

It is preferred to obtain a basic pitch having a softening point of 30 to 120° C. through the above process. If the softening point of the basic pitch is excessively increased through the heat treatment process, the composition ratio of 5-ring alkylaromatic condensates is excessively increased, so that a uniform application characteristic may not be acquired in application. Accordingly, it is preferred that the softening point is in the range of 30 to 120° C.

The vacuum heat treatment is a step of performing the second-step heat treatment process after charging the vinyl chloride polymer material allowing the supply of the polyene radical intermediate to the alkylaromatic condensate, which is a source material, to prepare the basic pitch having the softening point of 30 to 120° C., and then selectively removing at least 95% of a low molecular weight material, which has the molecular weight of 400 or less and includes the 1- and 2-ring alkylaromatic condensates, from the basic pitch.

It is preferred to employ the vacuum condition to produce the effect of lowering a temperature in heat treatment to prevent concentrates from being excessively created. Preferably, the vacuum condition is obtained by a 0.1-40 torr vacuum pump employing a simple mechanical manner. In addition, if the temperature for the vacuum heat treatment is less than 300° C., long time is required to remove a volatile component. If the temperature for the vacuum heat treatment is equal to or more than 390° C., both of the removal of the volatile component and the appearance of the optical anisotropic property may occur, which is undesirable. Accordingly, the temperature for the vacuum heat treatment is preferably in the range of 300 to 390° C., and more preferably 340 to 370° C. In addition, it is preferred that the time for the vacuum heat treatment is as short as possible. If the time is less than one hour, at least 95% of the volatile component may not be removed. If the vacuum heat treatment is performed for at least three hours, both of the removal of the volatile component and the appearance of the optical anisotropic property may occur. Accordingly, it is preferred that the time for the vacuum heat treatment is in the range of one to three hours.

The high softening point pitch according to the present invention includes 30 to 60 weight % of 3- and 4-ring alkylaromatic condensates among the whole molecules of the pitch, and a condensed aromatic material is linearly linked to the alkylaromatic condensates in a benzyl or methylene form to be polymerized.

In addition, an excessively condensed material is uniformly not melted, so that the excessively condensed material is undesirable. The high softening point pitch including 2-ring or less alkylaromatic condensates formed in a main unit and linearly linked to each other in the methylene form represents newtonian viscosity behavior in the melting process and has a low yield stress value. The induction of the molecular orientation is difficult in a melt-spinning process, so that high tensile strength of at least 1 GPa may not be represented in spite of isotropic pitch based carbon fiberization.

Although the high softening point pitch according to the present invention has an optically isotropic property, the high softening point pitch represents the melt rheological property of non-newtonian viscosity as the viscosity is lowered due to shear thinning resulting from the increase of a shear rate in a melting state. In addition, the high softening point pitch may have the yield stress value of 100 to 300 Pa at the temperature which is 50° C. higher than the softening point. Meanwhile, if the yield stress is less than 100 Pa, the molecular orientation may not be induced. If the yield stress is equal to or more than 300 Pa, uniform fiberization is difficult, so that the yield stress of at least 300 Pa is undesirable.

In contrast, a typical isotropic pitch represents newtonian melt viscosity behavior, and the viscosity of the typical isotropic pitch is not affected by the change of a front speed as generally known in the art. The typical isotropic pitch represents the yield stress value of 20 Pa or less at the temperature which is 50° C. higher than the softening point as generally known in the art.

The high softening point pitch according to the present invention includes materials having the molecular weight of 400 to 2000 amu. which has been measured through a Time of Flight Mass Spectroscopy (TOF-Mass) scheme of correcting the molecular weight to that of an aromatic compound having a molecular shape similar to that of a pitch, such as benzene, naphthalene, anthracene, pyrene, or coronene, by at least 95% of the whole materials, and the average molecular weight of the high softening point pitch is at least 720 amu.

The molecular weight of the pitch may be measured through an absolute molecular weight measurement scheme (for example, Vapor Pressure Osmometry) and a relative molecular weight measurement scheme (for example, Gel Permeation Chromatography, or Time of Flight Mass Spectroscopy).

Among them, according to the absolute molecular weight measurement scheme based on Vapor Pressure Osmometry, it is difficult to select a solvent to dissolve 100% of the high softening point pitch and to specify a markovnikov constant, so that proper measurement may be difficult.

In addition, according to the relative molecular weight measurement scheme based on Gel Permeation Chromatography, it is difficult to select a solvent to dissolve 100% of the high softening point pitch, to select a column to represent high dissolution power by appropriately separating molecules of the pitch mainly including oligomer having the molecular weight of at least 1000 amu, and to exactly specify the molecular weight of the pitch since the correction of the molecular weight is difficult due to molecules having similar molecular shapes. In particular, the molecular weight measured through Gel Permeation Chromatography and the distribution thereof may be estimated to be greater than a real molecular weight.

Figure 2:
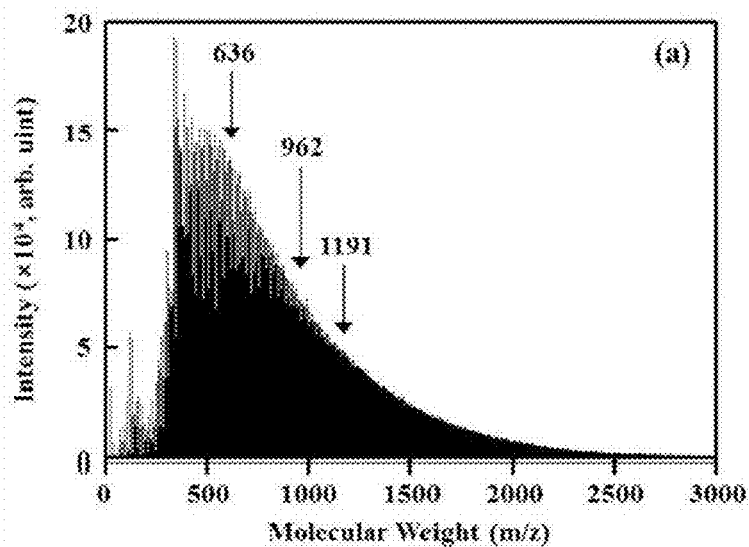
FIG. 2 is a graph showing the distribution of the molecular weight of the high softening point pitch acquired in Embodiment 1 through a TOF-Mass scheme.

Accordingly, according to the present invention, the molecular weight of the high softening point pitch is specified through the TOF-Mass scheme of exactly correcting the molecular weight to that of an aromatic compound having a molecular shape similar to that of a pitch, such as benzene, naphthalene, anthracene, pyrene, or coronene, As shown in FIG. 2, the molecular weight distribution of the high softening point pitch prepared according to embodiment 1 of the present invention is a result measured by a person having the full measurement experience in the state that the high softening point pitch is soluble in 99% of pyridine, and the molecular weight of the high softening point pitch is exactly corrected to that of an aromatic condense having the similar shape. Accordingly, the measurement result represents high reliability.

The high softening point pitch according to the present invention includes materials having the molecular weight of 400 to 2000 amu., which has been measured through the method, by at least 95% of the whole materials thereof and has the average molecular weight of at least 720 amu. which is 100 to 200 amu. higher than an average molecular weight of a conventional isotropic high softening point pitch prepared by performing simple heat treatment for the same source material or by a halogen addition scheme.

The high softening point pitch according to the present invention represents a higher molecular weight because the number of condensed aromatic rings may be increased by 1 or 2 on average in the process that the 1- and 2-ring alkylaromatic condensates formed through the Back-biting reaction of the polyene radical intermediate mutually react with alkylaromatic condensate radicals formed in the source material.

As shown in following table 1, the high softening point pitch prepared according to the embodiment of the present invention includes 3- and 4-ring alkylaromatic condensates by 30-60% of the whole materials, which represents relatively linear and higher aromatic characteristics. The higher aromatic characteristic allows the occurrence of non-newtonian melt viscosity behavior and an oxidation curing process with a lower oxygen content, and directly relates to a high carbonization yield.

In particular, when the high softening point pitch according to the present invention is used to prepare an isotropic pitch based carbon fiber through spinning, stabilizing and carbonizing, the high softening point pitch is subject to the curing process even with the lower oxygen content, so that the short-term curing process is possible. In addition, a higher carbonization yield may be acquired, and the defects on the fiber surface caused by the volatile component in a carbonization process may be reduced, so that there is an advantage to the expression of high tensile strength.

Although the high softening point pitch according to the present invention is an optically isotropic material, the high softening point pitch according to the present invention has a condensed ring in a lamination structure similar to that of graphite and an asphaltene structure, and has a uniform melting characteristic. In addition, the expression of the lamination structure similar to that of the graphite is related to non-newtonian viscosity behavior that shear thinning is expressed due to front stress in melting, so that viscosity is lowered.

The high softening point pitch according to the present invention has a softening point in the range of 290-340° C. and has 80-95% of fixed carbon when measured by performing heat treatment to 950° C. at an inert atmosphere.

Since the high softening point pitch prepared according to the present invention has a higher molecular weight, the high softening point pitch represents a higher softening point and a higher carbonization yield. However, since the high softening point pitch has the form of a polymer in which the alkylaromatic condensates are linked to each other in a benzyl or methylene form, the high softening point pitch represents a relatively uniform melting characteristic and a lower viscosity characteristic.

As described above in detail, there can be provided a high softening point pitch usable as a precursor of an isotropic pitch based carbon fiber having an excellent tensile strength, a high oxidation curing property, and a high carbonization yield through the method of preparing the high softening point pitch according to the present invention. Accordingly, the high softening point pitch according to the present invention is usable as a source material and a precursor of a high-functional carbon material for a carbon fiber, an active carbon fiber, or a negative electrode of a lithium ion based secondary battery.

Hereinafter, the configuration and the operation of the present invention will be described in more detail according to exemplary embodiments of the present invention. The following description of the exemplary embodiments of the present invention is made only for the illustrative purpose, but the present invention is not limited thereto. Contents, which are not described herein, will be will be sufficiently inferred from the detailed description by a person skilled in the art, and thus the details thereof will be omitted in order to avoid redundancy.

Embodiment 1

(1) Preparation of Pitch

In Embodiment 1, 80 g of ethylene bottom oil (EBO) and 20 g of polyvinyl chloride (PVC) powers were charged into a stirred glass reactor equipped with a reflux unit and mixed together while nitrogen was introduced, and heat treatment was performed at the temperature of 330° C. for three hours. After the heat treatment, non-reacting molecules or low-reacting molecules were removed by passing nitrogen gas at the flow rate of 100 mL/min for a predetermined time, heating was performed at the temperature of 370° C., heat treatment was performed for three hours, and then cooling was performed to a room temperature to prepare basic pitch and to obtain 72 g of basic pitch. Then, 50 g of prepared basic pitch were subject to vacuum heat treatment at the temperature of 350° C. under the pressure of 1 torr for 1.5 hours by a thin film evaporator to obtain 25 g of pitch (2) Evaluation of Physical Property of Source Material and Acquired Pitch The source material used in embodiment 1 represented 0.75 or more of aromaticity (fa) when being measured by the $^{13}$C-NMR, contained 1- and 2-ring alkylaromatic condensates occupying 85% or more of aromatic condensates when being estimated by a Gas Chromatography-Atomic Emission Detector (GC-AED), and represented about 200 amu. of an average molecular weight when being measured through a TOF-Mass.

The yield rate of the high softening point pitch acquired in Embodiment 1 was 34 weight % based on the whole weight of EBO and PVC used as the source material, and the softening point measured through the ASTM scheme was evaluated to 295° C. The aromaticity (fa) measured the $^{13}$C-NMR scheme was represented as 0.88 which was more largely increased as compared with that of the EBO used as the source material.

Following table 1 shows the distribution of rings of alkylaromatic condensate, which is measured through a GC-AED scheme. As shown in table 1, in Embodiment 1, the 3- and 4-ring alkylaromatic condensates occupy 54.3% of the high softening point pitch acquired in Embodiment 1.

TABLE 1

| Composition ratio (%) of Alkyl Condensed Ring | | | | | |
|---|---|---|---|---|---|
| Number of rings | | | | | |
| 1 ring | 2 rings | 3 rings | 4 rings | 5 rings | 6 rings or more |
| Embodiment 1 0.1 | 3.0 | 17.8 | 36.5 | 23.5 | 19.2 |

The molecular weight and the distribution of the molecular weight of the high softening point pitch acquired in Embodiment 1 were measured through the TOF-Mass scheme. As recognized from the measurement result, the average molecular weight of the high softening point pitch was 780 amu., which is about four times larger than 200 amu. which is the molecular weight of the EBO used as the source material. FIG. 2 shows the distribution of the molecular weight of the high softening point pitch measured through the TOF-Mass.

Figure 3:
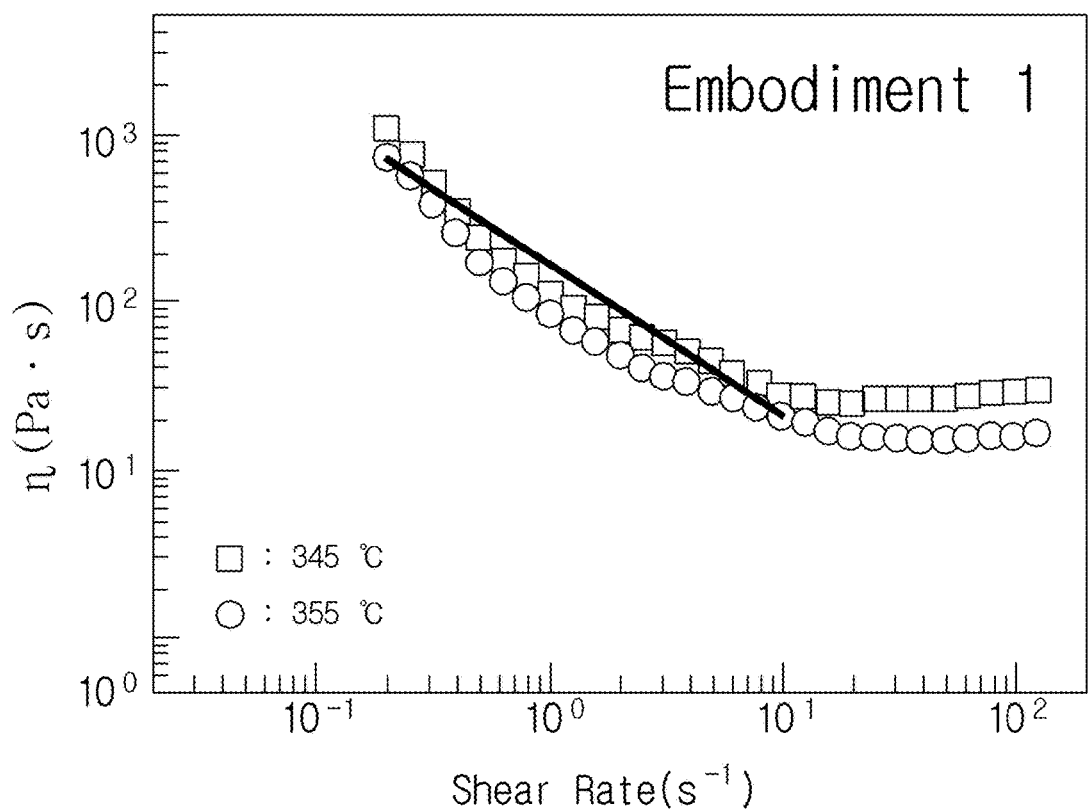
FIG. 3 is a graph showing the correlation between the shear rate and the viscosity of the high softening point pitch acquired in Embodiment 1.

FIG. 3 shows a measurement result of a melt flow characteristic of the pitch acquired in embodiment 1 by Rheometa. Accordingly, although the high softening point pitch according to the present invention has an optically isotropic property, the high softening point pitch represents the melt rheological property according to non-newtonian viscosity that the viscosity is lowered due to the expression of shear thinning resulting from the increase of a shear rate.

The yield stress measured and calculated according to a method disclosed in cited reference (Carbon 77, 747-755) represented a higher value of 204.6 Pa at the temperature of 345° C. The melt flow characteristic for viscosity measurement is measured with respect to the front speed of the prepared pitch using an advanced rheometric expansion system (ARES, TA Instruments, USA) employing a horizontal plate under a nitrogen atmosphere. The diameter of the horizontal plate was 25 mm, and data was acquired when the interval between plates was 0.8 mm. The strain was about 5%. A Dynamic frequency sweep measurement scheme was performed at an angular frequency of 0.1 to 200 rad/s. The measurement of the steady-state sweep for the measurement of the yield stress was performed at the temperature of 345° C. and 355° C. and at the shear rate of 0.05 to 200 s$^{-1}$.

Figure 4:
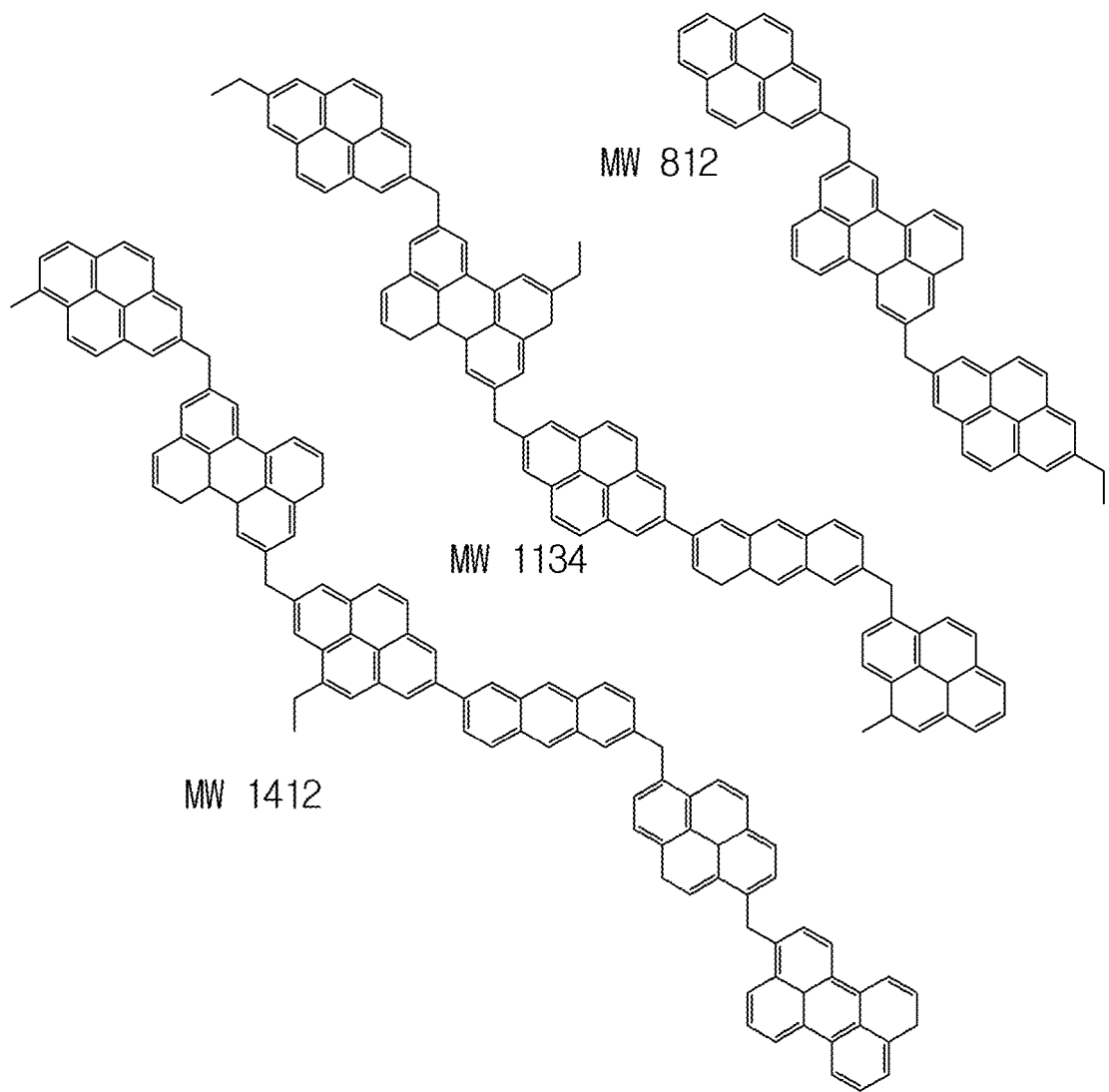
FIG. 4 is a view showing a representative molecular structure of the high softening point pitch acquired in Embodiment 1.

FIG. 4 shows a representative molecular structure of the high softening point pitch acquired in Embodiment 1, which is estimated by analyzing the result of measurement through the $^{13}$C-NMR, element analysis, GC-AED, and TOF-Mass schemes. As shown in FIG. 4, the pitch according to the embodiment 1 of the present invention contains 30 to 60 weight % of the 3- and 4-ring alkylaromatic condensates among the whole molecules of the pitch. The condensed aromatic material is linearly linked to the alkylaromatic condensates in a benzyl or methylene form to have a polymerized structure.

Figure 5:
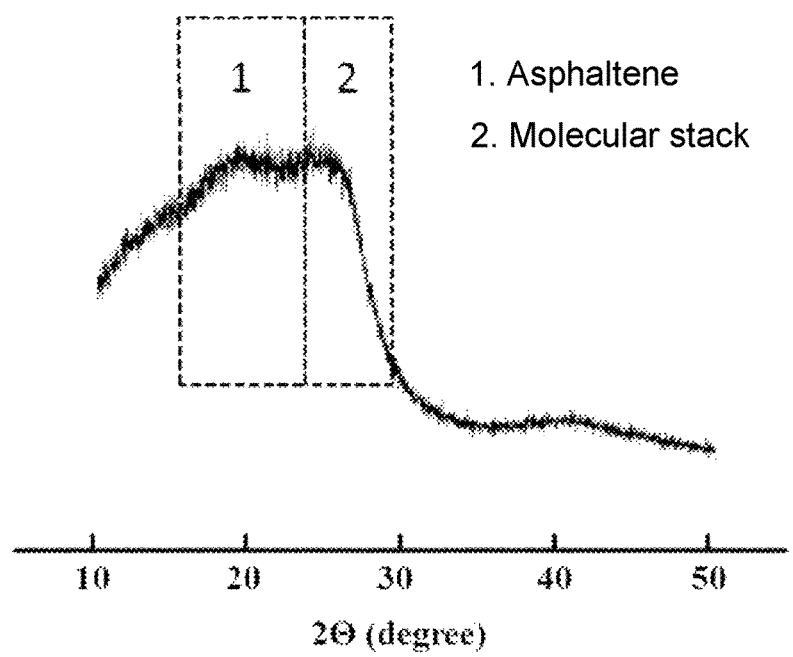
FIG. 5 is a graph showing a measurement result for the high softening point pitch acquired in Embodiment 1 by an XRD.

FIG. 5 shows the result obtained by analyzing the high softening point pitch acquired in Embodiment 1 through an XRD scheme. As shown in FIG. 5, in the pitch acquired in Embodiment 1, asphalten was located at position 1, and a lamination layer of molecules was located at position 2.

(3) Fiberization of Pitch (Melt-Spinning)

Figure 6:
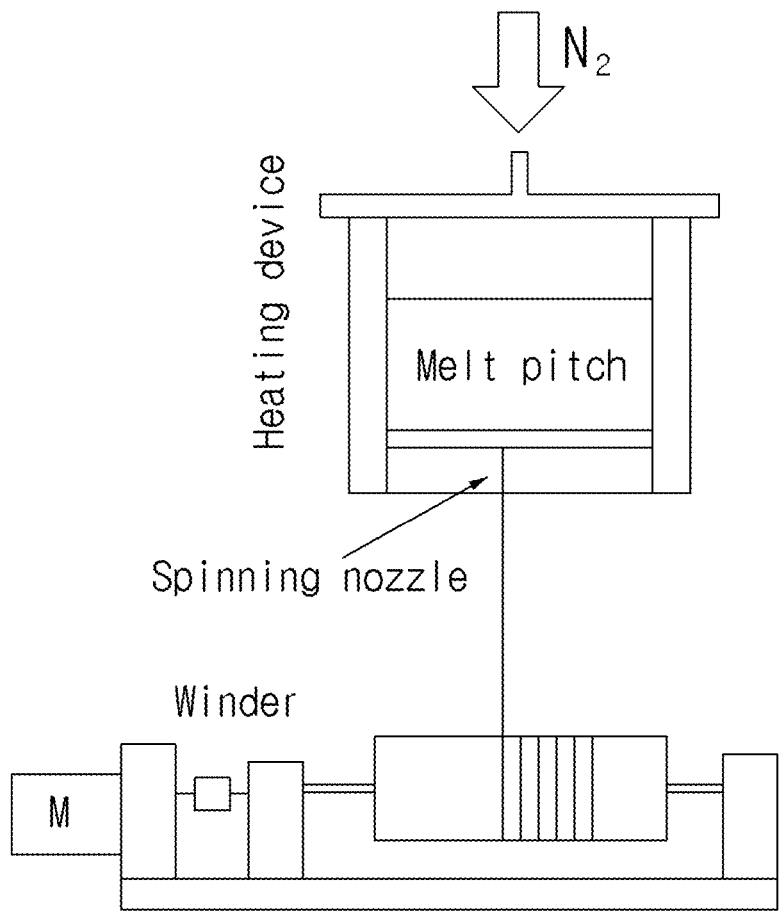
FIG. 6 is a schematic view showing a monofilament-melt spinning device of fiberizing high softening point pitches prepared according to the embodiment and a comparative example of the present invention.

The high softening point pitch acquired in Embodiment 1 is spun using a melt spinning device for short fiber as shown in FIG. 6. In this case, the spinning temperature is set to the temperature of 345° C. which is 50° C. higher than of the high softening point pitch. Accordingly, the pitch melted under nitrogen pressure of 0.1 Mpa is discharged while the pitch fiber is wound around a winder. The L/D of a nozzle used for spinning was 2, and a diameter of the nozzle was 0.2 mm. The spinning was continuously performed in the state that the thin fiber of the melted pitch is adjusted to about 10 μm by adjusting the discharge volume and the winding speed of the melted pitch. Accordingly, the high softening point pitch acquired in Embodiment 1 may be continuously spun without one mono filament for three minutes in the optimal spinning state, thereby representing significantly excellent spinning property (4) Oxidation Curing and Carbonization of Pitch Fiber An oxidation curing process was performed, using air serving as an oxidizing agent, with respect to a pitch fiber prepared by spinning the high softening point pitch acquired in Embodiment 1 using a melt spinning device for short fiber. The oxidation curing process was performed for 30 minutes by raising the temperature to 270° C. at a heating rate of 1° C./min after raising the temperature to 150° C. at the heating rate of 5° C./min. The diameter of a furnace used for the oxidation curing was 4.5 cm, and an air flow rate was 200 mL/min. The total time taken for the oxidation curing was three hours. The cured fiber subject to oxidation stabilization was processed for five minutes after raising the temperature to 800° C. at a nitrogen atmosphere and then carbonized. The carbonization yield after the carbonization was 86 weight % based on the weight of the pitch fiber.

Figure 7:
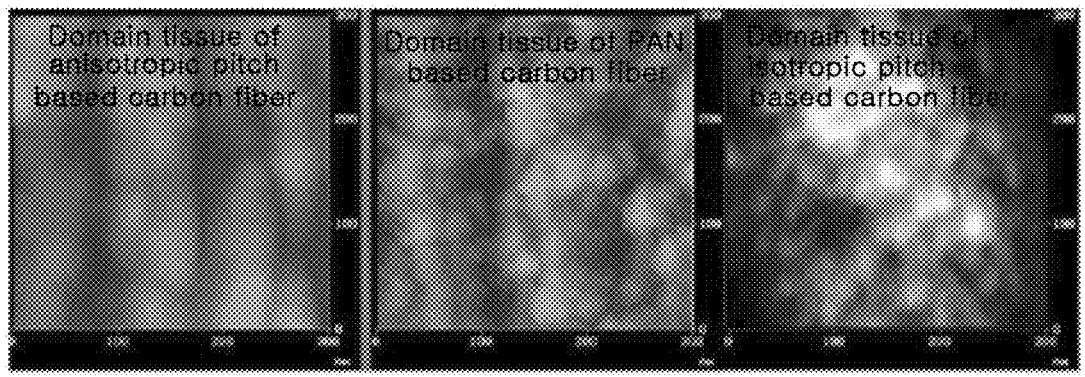
FIG. 7 shows images of a domain shape of a mesophase pitch based carbon fiber, a PAN carbon fiber, and an isotropic pitch based carbon fiber prepared in Embodiment 1, which are taken by a scanning tunneling microscopy (STM).

FIG. 7 shows photographs of a domain shape of a mesophase pitch based carbon fiber, a PAN carbon fiber, and an isotropic pitch based carbon fiber prepared in Embodiment 1, which are taken by a scanning tunneling microscopy (STM). As shown in FIG. 7, the domain of the carbon fiber prepared using the pitch in Embodiment 1 of the present invention has a shape different from those of the mesophase pitch based carbon fiber and the PAN carbon fiber.

Figure 8:
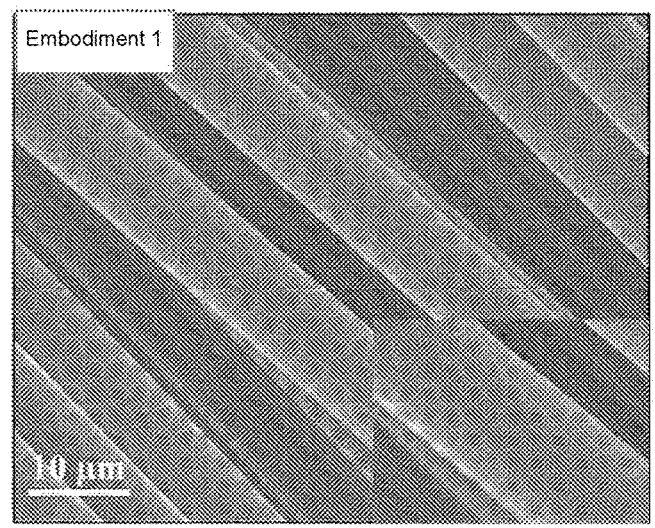
FIG. 8 is a photograph showing an image of the outer appearance of the carbon fiber obtained by spinning, curing, and carbonizing the high softening point pitch acquired in Embodiment 1, which is observed by a scanning electron microscope (SEM).

FIG. 8 is a photograph showing an image of the outer appearance of the carbon fiber obtained by spinning, curing, and carbonizing the high softening point pitch acquired in Embodiment 1, which is observed by a scanning electron microscope (SEM).

(5) Measurement of Physical Properties of Carbon Fiber

According to ASTM D-3039, the physical properties of the carbon fiber obtained by spinning, curing, and carbonizing the high softening point pitch acquired in Embodiment 1 were measured by a fiber strength meter. The physical properties of the carbon fiber obtained by spinning, curing, and carbonizing pitches acquired in Embodiment 1 and following Comparative Example 1 are summarized in following Table 2.

As shown in Table 2, regarding the physical properties of the carbon fiber obtained by spinning the pitch acquired in Embodiment 1, oxidation-stabilizing the pitch at the temperature of 270° C. for 30 minutes and carbonizing the pitch at the temperature of 800° C. for five minutes, the tensile strength was 1800 MPa, the tensile modulus was 54.5 GPa, and the elongation was 3.2%, which represents significantly excellent properties in spite of the isotropic pitch based carbon fiber. Table 2 shows the physical properties of the carbon fiber obtained using the acquired high softening point pitch.

TABLE 2

| Pitch | Tensile Strength (MPa) | | | |
|---|---|---|---|---|
| | Oxidation Curing Temperature (° C.) | | | |
| | 230 | 250 | 270 | 290 |
| Embodiment 1 | 840 | 1460 | 1800 | 1290 |
| Comparative Example 1 | 900 | 1090 | 1240 | 1180 |
| | Tensile modulus (GPa) | | | |
| Embodiment 1 | 31.1 | 48.7 | 54.5 | 44.5 |
| Comparative Example 1 | 32.1 | 35.2 | 38.8 | 43.7 |
| | Elongation (%) | | | |
| Embodiment 1 | 2.1 | 2.8 | 3.2 | 3.0 |
| Comparative Example 1 | 1.7 | 2.2 | 2.6 | 2.4 |

Embodiment 2

In Embodiment 2, 60 g of ethylene bottom oil (EBO) and 40 g of polyvinyl chloride (PVC) powers were charged into a stirred glass reactor equipped with a reflux unit and mixed together while nitrogen was introduced, and heat treatment was performed at the temperature of 330° C. for three hours. After the heat treatment, non-reacting molecules or low-reacting molecules were removed by passing nitrogen gas at the flow rate of 100 mL/min for a predetermined time, heating was performed at the temperature of 370° C., heat treatment was performed for three hours, and then cooling was slowly performed to a room temperature to prepare basic pitch and to obtain 70 g of basic pitch. Then, 50 g of the prepared basic pitch was subject to vacuum heat treatment at the temperature of 350° C. under the pressure of 1 torr for 1.5 hours by a thin film evaporator to obtain 23 g of pitch The yield rate of the acquired pitch was 32 weight %, and the softening point measured was evaluated to 305° C.

The composition ratio and the average molecular weight of 3- and 4-ring alkylaromatic condensates was 56.02% and 790 amu., respectively, as measured in the same manner as that of embodiment 1.

The carbonization yield, the tensile strength, the tensile modulus, and the elongation of the carbon fiber, which was obtained by spinning, oxidation-curing, and carbonizing the acquired high softening point pitch in the same manner as that of Embodiment 1 and under the same condition as that of Embodiment 1, were 87%, 1850 MPa, 57.3 GPa, and 2.8%, respectively.

Embodiment 3

In Embodiment 3, 80 g of ethylene bottom oil (EBO) and 20 g of polyvinyl chloride (PVC) powers were charged into a stirred glass reactor equipped with a reflux unit and mixed together while nitrogen was introduced, and heat treatment was performed at the temperature of 320° C. for six hours.

After the heat treatment, non-reacting molecules or low-reacting molecules were removed by passing nitrogen gas at the flow rate of 100 mL/min for a predetermined time, heating was performed at the temperature of 380° C., heat treatment was performed for 1.5 hours, and then cooling was slowly performed to a room temperature to prepare basic pitch and to obtain 75 g of basic pitch. Then, 50 g of the prepared basic pitch was subject to vacuum heat treatment at the temperature of 360° C. under the pressure of 10 torr for two hours by a thin film evaporator to obtain 27 g of pitch The yield rate of the acquired pitch was 41 weight %, and the softening point was 300° C.

The composition ratio and the average molecular weight of 3- and 4-ring alkylaromatic condensates was 50.88% and 740 amu., respectively, as measured in the same manner as that of embodiment 1.

The carbonization yield, the tensile strength, the tensile modulus, and the elongation of the carbon fiber, which was obtained by spinning, oxidation-curing, and carbonizing the acquired high softening point pitch in the same manner as that of Embodiment 1 and under the same condition as that of Embodiment 1, were 84%, 1750 MPa, 52.6 GPa, and 3.0%, respectively.

Embodiment 4

In Embodiment 4, 80 g of ethylene bottom oil (EBO) and 20 g of polyvinyl chloride (PVC) powers were charged into a stirred glass reactor equipped with a reflux unit and mixed together while nitrogen was introduced, and heat treatment was performed at the temperature of 330° C. for three hours. Before starting a reaction, the pressure, which was increased after a reaction was started in the state that pressure was not applied and heat treatment was finished, was lowered to an atmospheric pressure. Thereafter, non-reacting molecules or low-reacting molecules were removed by passing nitrogen gas at the flow rate of 100 mL/min for a predetermined time, heating was performed at the temperature of 370° C., heat treatment was performed for 3 hours, and then cooling was slowly performed to a room temperature to prepare basic pitch and to obtain 88 g of basic pitch. Then, 50 g of the prepared basic pitch was subject to vacuum heat treatment at the temperature of 350° C. under the pressure of 1 torr for 1.5 hours by a thin film evaporator to obtain 24 g of pitch.

The yield rate of the acquired pitch was 42 weight %, and the softening point was 297° C.

The composition ratio and the average molecular weight of 3- and 4-ring alkylaromatic condensates was 48.31% and 740 amu., respectively, as measured in the same manner as that of embodiment 1.

The carbonization yield, the tensile strength, the tensile modulus, and the elongation of the carbon fiber, which was obtained by spinning, oxidation-curing, and carbonizing the acquired high softening point pitch in the same manner as that of Embodiment 1 and under the same condition as that of Embodiment 1, were 83%, 2050 MPa, 62.8 GPa, and 3.1%, respectively.

Embodiment 5

In Embodiment 4, 80 g of ethylene bottom oil (EBO) and 20 g of polyvinyl chloride (PVC) powers were charged into a stirred glass reactor equipped with a reflux unit and mixed together while nitrogen was introduced, and heat treatment was performed at the temperature of 330° C. for six hours. Before starting a reaction, the pressure, which was increased after a reaction was started in the state that pressure was not applied and heat treatment was finished, was lowered to an atmospheric pressure. Thereafter, non-reacting molecules or low-reacting molecules were removed by passing nitrogen gas at the flow rate of 100 mL/min for a predetermined time, heating was performed at the temperature of 370° C., heat treatment was performed for 5 hours, and then cooling was slowly performed to a room temperature to prepare basic pitch and to obtain 92 g of basic pitch. Then, 50 g of the prepared basic pitch was subject to vacuum heat treatment at the temperature of 350° C. under the pressure of 1 torr for one hours by a thin film evaporator to obtain 19 g of pitch.

The yield rate of the acquired pitch was 35 weight %, and the softening point was 301° C.

The composition ratio and the average molecular weight of 3- and 4-ring alkylaromatic condensates was 55.94% and 810 amu., respectively, as measured in the same manner as that of embodiment 1.

The carbonization yield, the tensile strength, the tensile modulus, and the elongation of the carbon fiber, which was obtained by spinning, oxidation-curing, and carbonizing the acquired high softening point pitch in the same manner as that of Embodiment 1 and under the same condition as that of Embodiment 1, were 86%, 1750 MPa, 50.5 GPa, and 3.3%, respectively.

Comparative Example 1

In Comparative example 1, 100 g of ethylene bottom oil (EBO) was processed at the temperature of 370° C. for 6 hours to acquire 35 g of basic pitch. Among the acquired basic pitch, 20 g of basic pitch was subject to vacuum heat treatment at the temperature of 340° C. under the pressure of 0.1 torr for two hours by a thin film evaporator to obtain 10 g of pitch.

The yield rate of the acquired pitch was 18 weight %, and the softening point was 272° C.

The composition ratio of 3- and 4-ring alkylaromatic condensates was 18.32%, the composition ratio of 5-ring alkylaromatic condensate was 68%, and an average molecular weight was 620 amu.

The carbonization yield, the tensile strength, the tensile modulus, and the elongation of the carbon fiber, which was obtained by spinning, oxidation-curing, and carbonizing the acquired high softening point pitch in the same manner as that of Embodiment 1 and under the same condition as that of Embodiment 1, were 82%, 1240 MPa, 38.8 GPa, and 2.6%, respectively.

Comparative Example 2

In Comparative example 1, 100 g of ethylene bottom oil (EBO) was processed at the temperature of 330° C. for 10 hours to acquire 48 g of basic pitch. Among the acquired basic pitch, 20 g of basic pitch was subject to vacuum heat treatment at the temperature of 370° C. under the pressure of 1.0 torr for two hours by a thin film evaporator the same as that of Embodiment 1 to obtain 7 g of pitch.

The yield rate of the acquired pitch was 17 weight %, and the softening point was 280° C.

According to the measurement in the same manner as that of Embodiment 1, the composition ratio of 3- and 4-ring alkylaromatic condensates was 13.31%, the composition ratio of 5-ring alkylaromatic condensate was 58%, and an average molecular weight was 580 amu.

The carbonization yield, the tensile strength, the tensile modulus, and the elongation of the carbon fiber, which was obtained by spinning, oxidation-curing, and carbonizing the acquired high softening point pitch in the same manner as that of Embodiment 1 and under the same condition as that of Embodiment 1, were 80%, 950 MPa, 40.1 GPa, and 2.7%, respectively.

As described above, when the high softening point pitch acquired according to embodiments 1 to 5 of the present invention is used to prepare carbon fiber, the carbonization yield can be increased, and the physical property of the prepared carbon fiber can be improved as compared with those of the pitch acquired according to comparative examples 1 and 2.

What is claimed is:

1. A method of preparing a high softening point pitch, the method comprising:

performing heat treatment by adding a compound, which is able to form a polyene radical intermediate, to 1- to 4-ring alkylaromatic condensates to produce a basic pitch, and performing vacuum heat treatment for the basic pitch to produce the high softening point pitch for spinning, wherein the performing the heat treatment to produce the basic pitch comprises:

a primary heat treatment step of decomposing the compound, which is able to form the polyene radical intermediate, into a chlorine radical and the polyene radical intermediate and of reacting the chlorine radical with hydrogen of a 1-methyl group of an alkylaromatic condensate to produce an alkylaromatic condensate radical and to form a by-product including hydrogen chloride; and a secondary heat treatment step of reacting an aromatic condensed ring formed from the polyene radical intermediate with the alkylaromatic condensate radical to form a linear link in a benzyl or methylene form and to be polymerized.

2. The method of claim 1, wherein the 1- to 4-ring alkylaromatic condensates are coal and petroleum based byproducts and include at least one of α- or β-methylnaphthalene or mixed methylnaphthalene thereof, naphtha cracked oil or heat treatment oil thereof, creosote oil, coal tar, and a distilled coal tar pitch.

3. The method of claim 1, wherein the compound, which is able to form the polyene radical intermediate, is a vinyl chloride polymer based compound having a halogen pendant group allowing a back-biting reaction, which forms the polyene radical intermediate through decomposition by heat treatment at a temperature of 190° C. to 350° C. and forms an aromatic condensate in a heat treatment reaction process at a temperature of 350° C. to 390° C., and includes at least one of polyvinylchloride, polyvinylidenechloride, and a mixture or a copolymer thereof.

4. The method of claim 1, wherein the primary heat treatment step is performed for one to ten hours, and the secondary heat treatment step is performed for one to six hours.

5. The method of claim 1, wherein the vacuum heat treatment is performed under pressure of 0.1 torr to 40 torr, at a temperature of 300° C. to 390° C. for one to three hours such that at least 95% of a low molecular weight material, which has a molecular weight of 400 or less and includes the 1- and 2-ring alkylaromatic condensates, is removed from the basic pitch.

6. The method of claim 1, wherein the primary heat treatment step is performed at a temperature of 190° C. to 350° C. to form the polyene radical intermediate, and the secondary heat treatment step is performed at a temperature of 350° C. to 390° C. to react the polyene radical intermediate with the 1- to 4-ring alkylaromatic condensates such that the 3- and 4-ring alkylaromatic condensates have links in a benzyl or methylene form.

7. The method of claim 1, wherein the compound, which is able to form the polyene radical intermediate, is added at a ratio of 10 weight part to 100 weight part based on 100 weight part of the 1- to 4-ring alkylaromatic condensates.

8. A high softening point pitch prepared by the method according to claim 1, wherein the high softening point pitch comprises 30 weight % to 60 weight % of the 3- and 4-ring alkylaromatic condensates, and a condensed aromatic material is linearly linked to the alkylaromatic condensates in a benzyl or methylene form to be polymerized.

9. A high softening point pitch prepared by the method according to claim 1, wherein, although the high softening point pitch has an optically isotropic property, the high softening point pitch represents the melt rheological property according to non-newtonian viscosity as viscosity is lowered due to shear thinning resulting from increase of a shear rate in a melting state, and has a yield stress value of 100 Pa to 300 Pa at a temperature which is 50° C. higher than a softening point.

10. A high softening point pitch prepared by the method according to claim 1, wherein the high softening point pitch includes a material having a molecular weight of 400 amu. to 2000 amu., which is measured through a time of flight mass spectroscopy scheme of correcting the molecular weight to a molecular weight of an aromatic compound including a group including benzene, naphthalene, anthracene, pyrene, and coronene, by at least 95%, and has an average molecular weight of at least 720 amu.

11. A high softening point pitch prepared by the method according to claim 1, wherein, although the high softening point pitch is an optically isotropic material, a condensed ring thereof has a lamination structure similar to a lamination structure of graphite and an asphaltene structure.

12. A high softening point pitch prepared by the method according to claim 1, wherein the high softening point pitch has a softening point in the range of 290° C. to 340° C. and has 80% to 95% of fixed carbon when measured by performing heat treatment to 950° C. at an inert atmosphere.

* * * * *